United States Patent [19]

Herron et al.

[11] Patent Number: 4,846,411
[45] Date of Patent: Jul. 11, 1989

[54] TILT TUB BALE PROCESSOR HAVING TUB-MOUNTED ROTOR FEED CONTROL GRID

[76] Inventors: Maynard M. Herron, 761 Lewis Dr., Hesston, Kans. 67062; Ferol S. Fell, 609 Normandy, Newtown, Kans. 67114

[21] Appl. No.: 102,867

[22] Filed: Sep. 30, 1987

[51] Int. Cl.⁴ .......................................... B02C 13/286
[52] U.S. Cl. ............................ 241/101.7; 241/186.4; 241/285 B
[58] Field of Search ............. 241/101.7, 186 R, 186.4, 241/189 R, 37, 33, 73, 101 A, 285 B

[56] References Cited

U.S. PATENT DOCUMENTS

| | | | |
|---|---|---|---|
| 4,134,554 | 1/1979 | Morlock | 241/186 R X |
| 4,364,526 | 12/1982 | White | 241/186.4 |
| 4,448,361 | 5/1984 | Marcy | 241/101.7 |

FOREIGN PATENT DOCUMENTS 747452  7/1980  U.S.S.R. ........................... 241/186.4

Primary Examiner—Mark Rosenbaum

[57] ABSTRACT

Grid members for supporting a bale of hay within the tub of a tilt-tub bale processor are fixed to the floor of the tiltable tub and extend across an opening in the floor in order to control the feed rate of crop materials toward the chopping and disintegrating rotor. The tub is shiftable to any one of a number of slightly tilted orientations so that bottom reaches of the bale within the tub engage only a selected portion of rotor hammers. If the rotor tends to plug, the tub can be tilted away from the rotor and the grid members supporting the bale simultaneously shift lower reaches of the bale away from the rotor hammers so that the latter are able to clear. In preferred embodiments, a knife extends across the floor opening in transverse relation to the supporting grid members to provide a pinch point for crop materials entering the rotor chamber.

5 Claims, 1 Drawing Sheet

TILT TUB BALE PROCESSOR HAVING TUB-MOUNTED ROTOR FEED CONTROL GRID

BACKGROUND OF THE INVENTION

1. Field of the Invention

This invention relates to an apparatus for controlling the feed rate of crop materials toward a chopping and disintegrating rotor of a processor having a feed tub supported for pivotal movement between a tilted, crop loading position and an upright, crop processing position.

2. Description of the Prior Art

In recent years, the use of machines known as tilt-tub bale processors has gained widespread acceptance. The tub of such processors, as the name implies, is tiltable 90-degrees about a horizontal axis for loading large, round bales of hay by scooping the same from the ground as the machine is backed toward and into the materials. Once loaded, the tub is returned to an upright position and the chopping rotor disintegrates the materials and directs the latter through a discharge spout. An example of a tilt-tub processor is described and illustrated in U.S. Pat. No. 4,448,361, dated May 15, 1984.

The chopping rotor of tilt-tub bale processors is located within an open-topped rotor chamber that is mounted on a mobile chassis of the processor. On the other hand, a floor of the tub, being mounted for simultaneous movement with walls of the tub during pivotal motion of the tub about its horizontal tilting axis, has an opening disposed in directly overlying disposition to the open top of the rotor chamber to enable materials in the tub to pass through the floor and into the chamber. The shape of the opening in the floor is complemental to the configuration of the opening in the top of the rotor chamber in order to confine the flow of the crop materials and substantially prevent passage of the same along paths between the top of the rotor chamber and the bottom surface of the floor.

The walls of tilt-tub processors are rotatable about an upright axis when the tub is in its upright, processing position to facilitate feeding of the materials from the bale into the rotor chamber which is somewhat smaller than the entire area of the tub floor. As a consequence, structure is provided for enabling rotative movement of the tub walls relative to the floor so that the opening in the floor is inevitably in alignment with the underlying open top of the rotor chamber when the tub is in its upright, processing position.

The rotor of the processor typically carries a number of hammers which chop and otherwise disintegrate the crop materials. The circular path of the outer edge of the hammers during rotation of the rotor includes a portion extending through the opening of the floor and into the bale receiving receptacle thereabove, to allow the hammers to contact and break away crop materials from the bottom of the bale while the forces of gravity continuously urge remaining crop materials of the bale in the downwardly direction toward the hammers.

Conventionally, the top of the rotor chamber carried a number of grid members or bars which extended from one side of the opening to another between the paths of travel of adjacent hammers. The grid members served to support the bale and thereby partially restrict the quantity of crop materials in engagement with the same in an attempt to deter plugging of the rotor as occurs when the flow rate of materials toward the same exceeds the processing capacity of the hammers.

During rotation of the rotor, a limited space exists between the paths of travel of adjacent hammers. Thus, the supporting grid members were heretofore fixed to top portions of the rotor chamber in order to assure that the hammers would not come into damaging contact with the grid members during the relatively high-speed rotation of the rotor. Since the floor of these types of processors is tiltable relative to the top of the rotor chamber, the conventional practice of fixing the grid members to the rotor chamber provided assurance that contact between the hammers and the grid members would be avoided and also served the purpose of providing further bracing for the open-topped rotor chamber.

However, plugging of crop materials is still occasionally observed in tilt-tub processors for one reason or another. Unfortunately, once the speed of the rotor decreases due to plugging, tilting of the tub to raise the floor of the tub away from the rotor chamber often does not solve the problem because a large portion, if not all, of the crop materials within the tub may still pass through the opening and bear against the rotor. It would be desirable, therefore, to provide an inexpensive solution for these and other problems.

SUMMARY OF THE INVENTION

The present invention is directed toward a feed control grid, or more particularly a number of elongated, crop-supporting grid members which are shiftable as a unit toward and away from a position between the paths of adjacent hammers of a tilt-tub bale processor. The grid members provide adjustable support for a portion of the crop materials overlying the rotor and as a consequence selective movement of the members toward or away from the rotor provides control of the feed rate of crop materials toward the hammers. Consequently, the grid members can be shifted away from the rotor whenever plugging is observed or appears to be eminent to thereby reduce or halt the flow of materials to the rotor and allow the same to self-clear.

Advantageously, the grid members may be shifted to any one of a number of positions relative to the adjacent hammers in a direction radially of the rotor. In this manner, the feed rate of materials into the rotor can be precisely controlled. Additionally, the average length of the chopped materials may be varied by adjusting the position of the grid members relative to the path of travel of an outer edge of the hammers. Moreover, the power requirements of the processor may be reduced by simply shifting the supporting grid members away from the rotor.

In preferred embodiments of the invention, the grid members are fixedly joined to the floor of the tub bin and extend across the perimeter of the floor opening between the paths of adjacent hammers when the tub is in its upright or processing position. As such, the operator can easily regulate the feed rate of hay from the tub by varying the angle of the tub relative to the rotor chamber. Since the tilting motion of the tub is effected by a hydraulically powered piston and cylinder assembly, mounting of the grid members directly on the floor of the tub provides an economical and satisfactory solution for precisely controlling the feed rate of materials toward the hammers.

DETAILED DESCRIPTION OF THE DRAWINGS

Figure 1:
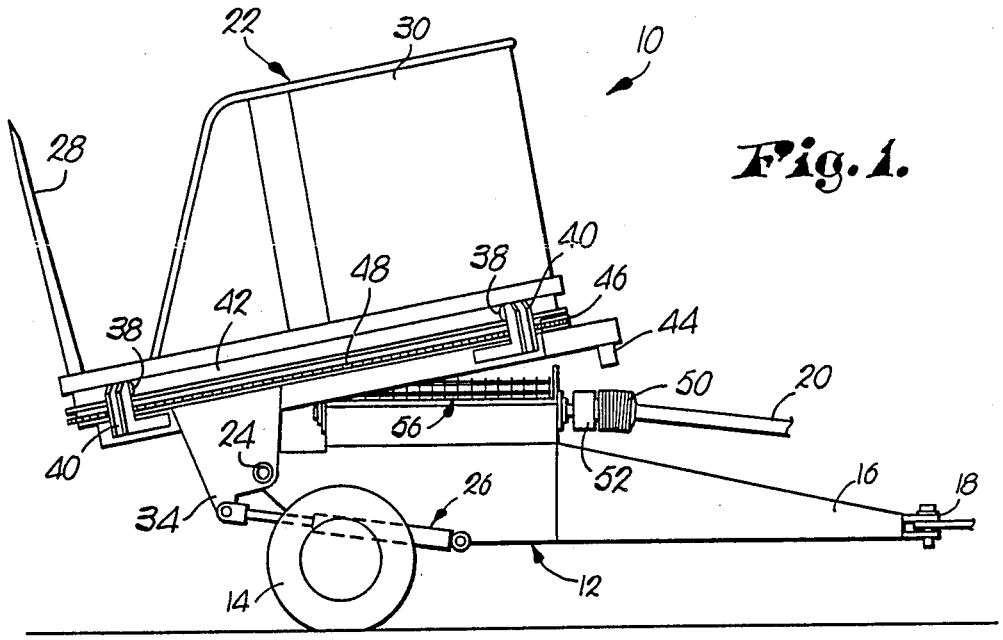
FIG. 1 is a side elevational view of a tilt-tub bale processor having a feed control grid of the present invention, showing the tub of the processor tilted somewhat away from a crop disintegrating rotor.

Referring intially to FIG. 1, a tilt-tub bale processor is broadly designated 10 and includes a chassis 12 mounted on a pair of wheels 14 (only one shown) for advancement along a path of travel over the ground as determined by a towing vehicle (not shown). A fore-and-aft extending tongue 16 of the processor 10 has a hitch 18 adapted for releasble connection with the towing vehicle. In addition, a drive shaft 20 extending above tongue 16 is connected to a source of rotary power such as a power take-off unit of a towing tractor.

The processor 10 includes a tub 22 swingably connected to the chassis 12 by means of a pivot 24 for movement about a horizontal axis. A hydraulically powered, fluid piston and cylinder assembly 26 is selectively actuated by an operator to control tilting movement of the tub 22 for disposing the latter in any one of a number of orientations. As can be understood by reference to the aforementioned U.S. Pat. No. 4,448,361, when the piston of assembly 26 is fully retracted the tub 22 is in a fully tilted position adjacent the ground for loading of a bale of hay upon movement of the mobile chassis 12 in a rearward direction. On the other hand, extension of the piston of assembly 26 enables the tube 22 to shift toward any one of a plurality of upright, processing positions as will be further explained hereinbelow.

Figure 2:
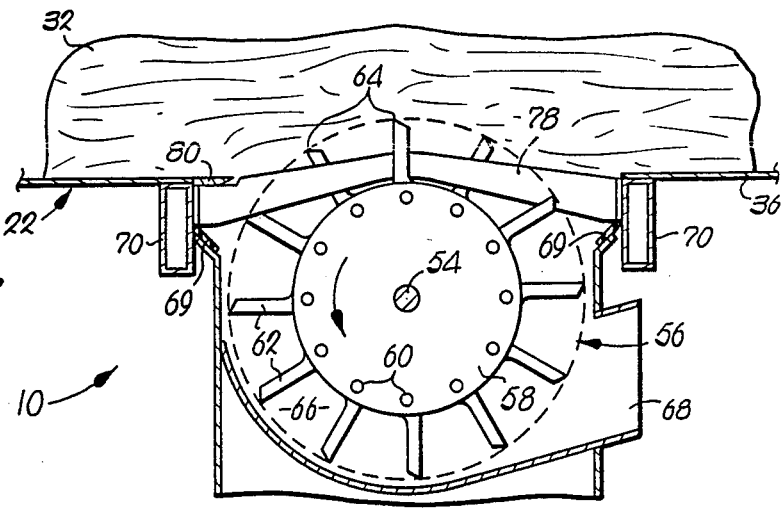
FIG. 2 is a fragmentary, enlarged, end cross-sectional view of the processor shown in FIG. 1, but with the tub in its fully upright position, showing details of the rotor and rotor chamber as well as one member of the feed control grid.
Figure 3:
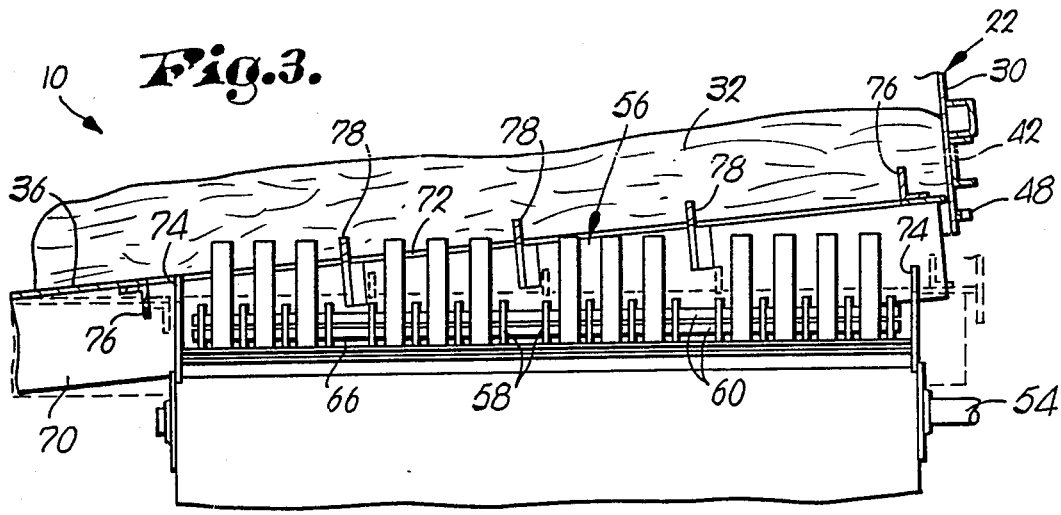
FIG. 3 is an enlarged, fragmentary, side cross-sectional view of the rotor and feed control grid shown in FIGS. 1 and 2 except that the tub is tilted somewhat from its orientation shown in FIG. 2.

The tub 22, in more detail, has a pair of upwardly extending prongs 28 (only one shown) as well as a curved wall 30 having a somewhat semicylindrical configuration. The prongs 28 and wall 30 extend in an upwardly direction when the tub 22 is in one of its possible upright or crop processing positions such as is shown in FIGS. 1, 2 and 3. The prongs 28 and wall 30 comprise a means for confining a quantity of crop materials 32 (FIGS. 2 and 3) once the latter have been loaded into the tub 22 of processor 10.

The tub 22 also includes a subframe 34, a portion of which is seen in FIG. 1, and which is connected to pivot 24. The subframe 34 carries a floor 36 disposed within the confines of the curved wall 30. The subframe 34, floor 36 and wall 30 all move simultaneously about pivot 24 during extension or retraction of piston and cylinder assembly 26.

The wall 30 and prongs 28 are rotatable relative to the floor 36, and are supported by a number of rollers 38 that are carried by brackets 40 affixed to subframe 34 as shown in FIG. 1. The rollers 38 are received in a U-shaped track 42 (see also FIG. 3) that circumscribes a lower portion of wall 30 in fixed relationship thereto. A reversible hydraulic motor 44 powers a circular drive member 46 having a circumferential series of spaced rollers that sequentially engage teeth of a sprocket 38 fixed relative to wall 30 for rotation of the tub confining means, or wall 30 and prongs 28 in either direction relative to floor 36.

The drive shaft 20 is connected by means of a universal joint 50 and a clutch 52 to a shaft 54 of a rotor 56 that is illustrated in FIGS. 1, 2, and 3. Referring now to FIGS. 2 and 3, the rotor 56 is comprised of a series of spaced apart circular plates 58 that are interconnected by a number of peripheral rods 60 extending in a direction parallel to shaft 54. In the space between certain adjacent pairs of plates 58, one or more hammers 62 are mounted on respective rods 60 for swinging movement between a radially extending orientation as is shown in FIG. 2, and a retracted position which is not illustrated in the drawings. The path of travel of an outer edge 64 of each hammer 62 is represented by the outlines in FIG. 3, where it can also be observed that hammers such as hammers 62 are not provided for correspondence between a certain three of the spaces between adjacent pairs of plates 58.

The rotor 56 is surrounded by a rotor chamber 66 that is carried by the chassis 12 in fixed relation thereto. The chamber 66 is defined by upright sidewalls and a curved bottom wall complemental to the path of travel of the outer edges 64 of hammers 62. The bottom wall and a sidewall of chamber 66 terminate in a discharge spout 68 which provides an outlet for crop materials chopped and ejected by the hammers 62 from chamber 66.

Opposite sidewalls of chamber 66 are provided with a strip 69 of rubber-like material that is engagable with two spaced, parallel beams 70 that define opposite sides of an opening 72 in the tub floor 36. The remaining sidewalls of chamber 66 include two upright plates 74 (see FIG. 3) having an arched upper surface. When the tub 22 is in its fully upright position as depicted in FIG. 2, the plates 74 are received in the floor opening 72 at a location closely adjacent respective elongated, L-shaped members 76 that define opposite sides of the remaining extent of the perimeter of opening 72.

In accordance with the invention, a rotor feed control grid is fixed to the tub 22 for pivotal movement therewith relative to the rotor 56 and the rotor chamber 66. The control grid comprises three spaced, elongated grid members 78 as can be appreciated by reference to FIG. 3. Viewing FIG. 2, opposite ends of the grip members 78 are affixed to respective upper portions of beams 70 directly above rubber strips 69 when the tub 22 is in its fully upright position. Each grid member 78 has slightly arched configuration to safely clear the longitudinally extending rods 60 of rotor 56.

Finally, an elongated knife element 80 is fixed to the tub floor 36 along the perimeter of floor opening 72 and adjacent one of the beams 70. The knife element 80 cooperates with the hammers 62 to promote chopping and disintegration of crop materials and essentially provides a pinch point for materials passing through to the rotor chamber 66 therebelow.

OPERATION

Once a bale of crop materials has been scooped up by the tub 22, the piston and cylinder assembly 26 is extended to return the tub 22 toward an upright or processing position. As the tub floor 36 moves towards the rotor 56, the bale of crop materials 32 partially supported by the grid members 78 moves toward the hammers 62 which rotate at a high speed along the circular path depicted by the dashed line in FIG. 2. When the tub 22 is in the fully upright position as shown in FIG. 2 which represents one end limit of the tilting motion of the same, the outer edges 64 of hammers 62 travel along a path above the top of the grid members 78 and dig into bottom regions of the bale supported by the latter.

The weight of the bale continuously urges fresh crop materials 32 toward the rotor 56 so that the hammers 62 are constantly exposed to new crop materials 32. The materials 32 are thrown in the direction of movement of the hammers 62, swept into the rotor chamber 66 and ejected through the discharge spout 68. The knife element 80 facilitates chopping and disintegration of the materials 32 as they pass adjacent the knife.

In the event that a decrease in rotational speed of the rotor 56 is observed, the operator activates a hydraulic switch to direct fluid pressure toward one end of the cylinder of the piston and cylinder assembly 26, causing the latter to retract somewhat and tilt the subframe 34 about pivot 24. As a consequence, the grid members 78 will shift away from their position shown in FIG. 2 and toward an orientation shown in FIG. 3 such that the tops of the grid members 78 are somewhat spaced from the outer limits of the paths of travel of the hammer outer edges 64. Consequently, the shiftable grid members 78 enable the load on rotor 56 to be quickly reduced and enable the hammers 62 to clear under most circumstances. Once an increase in rotor speed is observed, the piston of the piston and cylinder assembly 26 may again be extended to bring the tub floor 36 and the member 78 connected thereto to the position shown in FIG. 2 for enabling disintegration of the crop materials to proceed as quickly as possible.

In the event that a somewhat slower chopping rate is desired, or in the event that the materials are to be chopped more finely, the tub 22 may be positioned by the piston and cylinder assembly 26 in any one of a number of slightly tilted orientations between the respective orientations shown in FIGS. 2 and 3. In this manner, the tops of at least some of the bale supporting grid members 78 may be located just below the paths of travel of the outer edges 64 of hammers 62 so that only a relatively small, outer portion of the hammers 62 comes into contact with crop materials 32 at the lower end of the bale. As a consequence, reliable control over the feed rate of the crop materials 32 is conveniently provided with little additional expense in comparison to tilt-tub processors known in the art.

As can be observed in FIG. 3, each of the grid members 78 corresponds to one of the aforementioned spaces between adjacent pairs of plates 58 that are free of hammers such as hammer 62, so that the grid members 78 freely clear the same. If desired, grid members 78 disposed closest to the pivot point 24 may be oriented somewhat higher than those grid members 78 further away from pivot point 24 to facilitate clearing of the grid, members 78 between the hammers 62 and enable the latter to be more closely spaced in horizontal directions to the respective grid members 78.

We claim:

1. In a machine for disintegrating crop materials having a chassis, a floor, pivot means coupling said floor to said chassis for selective movement about a generally horizontal axis between a tilted position and a processing position, selectively actuatable power means operably coupled with said floor for swinging the floor in selectively variable amounts about said axis, and confining means extending in an upwardly direction from said floor when the latter is in said processing position and defining a receptacle for receiving a quantity of crop materials, wherein said confining means is selectively rotatable relative to said floor, the improvement comprising:

means defining the perimeter of an opening in the floor;

a rotor carried by said chassis in disposition underlying said opening in the floor when the latter is in said processing position and including a number of spaced apart elements each having an outer edge portion movable about a generally horizontal axis along a circular path of travel during rotation of the rotor, said circular path of travel of said outer edge portion of said elements including a portion extending above said opening and into said crop receiving receptacle when said floor is in said processing position; and at least one control grid member extending across said opening in said floor for supporting at least a portion of the crop materials within said receptacle, said at least one member being disposed below said portion of said path of travel of said outer edge portion of said elements when said floor is in said processing position for enabling said elements to engage crop materials within said receptacle, said pivot means being spaced from the rotor a sufficient distance as to cause the entire floor to lift off and become spaced from the rotor when the floor is raised toward the tilted position from the processing position, said at least one grid member being secured to said floor for movement therewith whereby the grid member and crop materials supported thereon may be lifted entirely off the rotor to terminate engagement of the rotor with the materials by operating the power means to raise the floor out of the processing position.

2. The invention as set forth in claim 1, wherein said at least one grid member is somewhat arched-shaped and presents a central portion extending above said floor.

3. The invention as set forth in claim 1, and including knife means fixed to said floor adjacent said opening in generally transverse relationship to said grid members.

4. The invention as set forth in claim 1, wherein the horizontal axis defined by said pivot means extends transversely with respect to the axis of rotation of said rotor.

5. The invention as set forth in claim 4, wherein said chassis is provided with ground wheels to permit the machine to be moved in a fore-and-aft direction during use, said pivot means being disposed rearwardly of the rotor with respect to the path of forward travel of the machine and said power means being adapted to swing the floor rearwardly from the processing position and into a substantially upright orientation with the confining means substantially horizontal when the floor is in said tilted position whereby a bale of crop materials may be scooped into the confining means and loaded into the machine as the machine is backed toward the bale.

* * * * *